United States Patent
Hammond

(10) Patent No.: US 10,215,453 B2
(45) Date of Patent: Feb. 26, 2019

(54) MOTORCYCLE AIR CONDITIONING AND COOLING DEVICE

(71) Applicant: Bruce Hammond, Aurora, CO (US)

(72) Inventor: Bruce Hammond, Aurora, CO (US)

(73) Assignee: Bruce Hammond, Aurora, CO (US)

( * ) Notice: Subject to any disclaimer, the term of this patent is extended or adjusted under 35 U.S.C. 154(b) by 791 days.

(21) Appl. No.: 14/479,620

(22) Filed: Sep. 8, 2014

(65) Prior Publication Data

US 2016/0068046 A1    Mar. 10, 2016

(51) Int. Cl.
| | |
|---|---|
| *F25B 21/00* | (2006.01) |
| *F25B 21/02* | (2006.01) |
| *F25B 21/04* | (2006.01) |
| *B60H 1/32* | (2006.01) |
| *B62K 11/00* | (2006.01) |
| *F28D 1/04* | (2006.01) |

(Continued)

(52) U.S. Cl.
CPC ......... *F25B 21/02* (2013.01); *B60H 1/00407* (2013.01); *B62J 33/00* (2013.01); *B62K 11/00* (2013.01); *F25B 2321/0252* (2013.01)

(58) Field of Classification Search
CPC . F25B 21/02; F25B 21/04; B60H 1/32; B60H 1/3201; B60H 1/3229; B60H 2001/2275; B62K 11/00; F28D 1/0472; F28D 7/02; F28D 7/022; F28D 7/024; F28D 7/026; F28D 7/028

See application file for complete search history.

(56) References Cited

U.S. PATENT DOCUMENTS 3,831,321 A * 8/1974 Johnson .................... F24F 1/04
                                                                    49/465
4,053,732 A * 10/1977 Carter ..................... F24H 3/081
                                                                    126/101

(Continued)

FOREIGN PATENT DOCUMENTS

| JP | 10129248 A | * | 5/1998 |
|---|---|---|---|
| JP | 2008302835 A | | 12/2008 |
| KR | 1010205430000 | | 3/2011 |

OTHER PUBLICATIONS

Machine Translation of JP 10129248 A, May 1998.*

(Continued)

*Primary Examiner* — Frantz Jules
*Assistant Examiner* — Erik Mendoza-Wilkenfe
(74) *Attorney, Agent, or Firm* — Kevin E. West; Advent, LLP

(57) ABSTRACT

A motorcycle air conditioning device, a motorcycle rider cooling device, and an air conditioning cooling system are described that include using a thermoelectric device and/or a turbo fan mountable on a motorcycle, all-terrain vehicle, or utility task vehicle. The motorcycle air conditioning device, the motorcycle rider cooling device, and the air conditioning cooling system may thus provide directed cooled air for a rider. In implementations, the motorcycle air conditioning device includes a heat dissipation assembly; a cooling assembly further including a a thermoelectric device; and a housing assembly configured to provide an enclosure to the heat dissipation assembly and the cooling assembly, where the housing is configured to be coupled to a motorcycle or other vehicle and provide cooled air to a rider and/or user.

18 Claims, 7 Drawing Sheets

(51) Int. Cl.
 *F28D 7/02* (2006.01)
 *B60H 1/00* (2006.01)
 *B62J 33/00* (2006.01)

(56) References Cited

U.S. PATENT DOCUMENTS

| | | | | |
|---|---|---|---|---|
| 4,210,102 | A | * | 7/1980 | Dosmann .............. F24D 17/001 122/20 B |
| 4,269,663 | A | * | 5/1981 | McFee ..................... B01D 3/02 202/185.3 |
| 4,964,282 | A | * | 10/1990 | Wagner .............. A41D 13/0025 2/DIG. 1 |
| 7,458,528 | B2 | | 12/2008 | Ridgeway et al. |
| 8,403,304 | B2 | | 3/2013 | Petersen |
| 2002/0124574 | A1 | * | 9/2002 | Guttman .............. A41D 13/005 62/3.3 |
| 2003/0140636 | A1 | | 7/2003 | Van Winkle |
| 2004/0025516 | A1 | * | 2/2004 | Van Winkle ....... B60H 1/00478 62/3.3 |
| 2005/0025901 | A1 | * | 2/2005 | Kerluke ................. B05D 3/068 427/496 |
| 2006/0279113 | A1 | * | 12/2006 | Pautz ................... B60N 2/5642 297/180.14 |
| 2007/0215159 | A1 | * | 9/2007 | Ross ........................ A62B 7/08 128/205.28 |
| 2009/0139473 | A1 | | 6/2009 | McMillan |
| 2009/0261137 | A1 | | 10/2009 | Nooshin |
| 2013/0270018 | A1 | * | 10/2013 | Kim ....................... B60K 11/00 180/54.1 |

OTHER PUBLICATIONS

International Search Report and Written Opinion dated Nov. 30, 2015 for PCT/US2015/048039.
International Preliminary Report on Patentability dated Mar. 23, 2017 for PCT/US2015/048039.

* cited by examiner

MOTORCYCLE AIR CONDITIONING AND COOLING DEVICE

BACKGROUND

An air conditioning system can include a system designed to alter air to a more comfortable condition, for example altering temperature or humidity. An air conditioning system can function to distribute altered air for improving thermal comfort and indoor air quality. The cooling can be achieved through some type of refrigeration cycle, evaporation, or free cooling.

SUMMARY

A motorcycle air conditioning device, a motorcycle rider cooling device, and an air conditioning cooling system are described that include using a thermoelectric device and/or a turbo fan mountable on a motorcycle, all-terrain vehicle, or utility task vehicle. The motorcycle air conditioning device, the motorcycle rider cooling device, and the air conditioning cooling system may thus provide directed cooled air for a user and/or rider. In implementations, the motorcycle air conditioning device that employs example techniques in accordance with the present disclosure includes a heat dissipation assembly further including a hot water pump, a hot water piping coupled to the hot water pump, a hot water block coupled to the hot water piping, and a radiator coupled to the hot water piping; a cooling assembly further including a turbo fan assembly, a water coil disposed in housing for the turbo fan, cool water piping coupled with the water coil, a cool water pump coupled to the cool water piping, a cool water block coupled to the cool water piping, and a thermoelectric device coupled to the cool water block, where the thermoelectric device is configured to transfer heat from the cool water block to the hot water block; and a housing assembly configured to provide an enclosure to the heat dissipation assembly and the cooling assembly, where the housing is configured to be coupled to a motorcycle and provide cooled air to a rider. In implementations, a motorcycle rider cooling device includes a cooling assembly including a turbo fan assembly, where the turbo fan assembly is configured to be electrically coupled to a motorcycle; and a housing assembly configured to provide an enclosure to the cooling assembly, where the housing is configured to be coupled to a motorcycle and provide cooled air to a rider, where the cooling assembly is configured to be disposed on a motorcycle such that the turbo fan directs air onto a rider. In implementations, an air conditioning cooling system that employs example techniques in accordance with the present disclosure includes a heat dissipation assembly further including a hot water pump, hot water piping coupled to the hot water pump, a hot water block coupled to the hot water piping, a radiator coupled to the hot water piping, and a fan disposed adjacent to the radiator, where the fan is configured to blow air through the radiator; a cooling assembly including a turbo fan assembly, a water coil disposed in housing for the turbo fan, cool water piping coupled with the water coil, a cool water pump coupled to the cool water piping, a cool water block coupled to the cool water piping, and a thermoelectric device coupled to the cool water block, where the thermoelectric device is configured to transfer heat from the cool water block to the hot water block; a housing assembly configured to provide an enclosure to the heat dissipation assembly and the cooling assembly, where the housing is configured to be coupled to a motorcycle and provide cooled air to a rider; and a controller coupled to at least one of the turbo fan, the thermoelectric device, the hot water pump, or the cool water pump.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Figure 1:
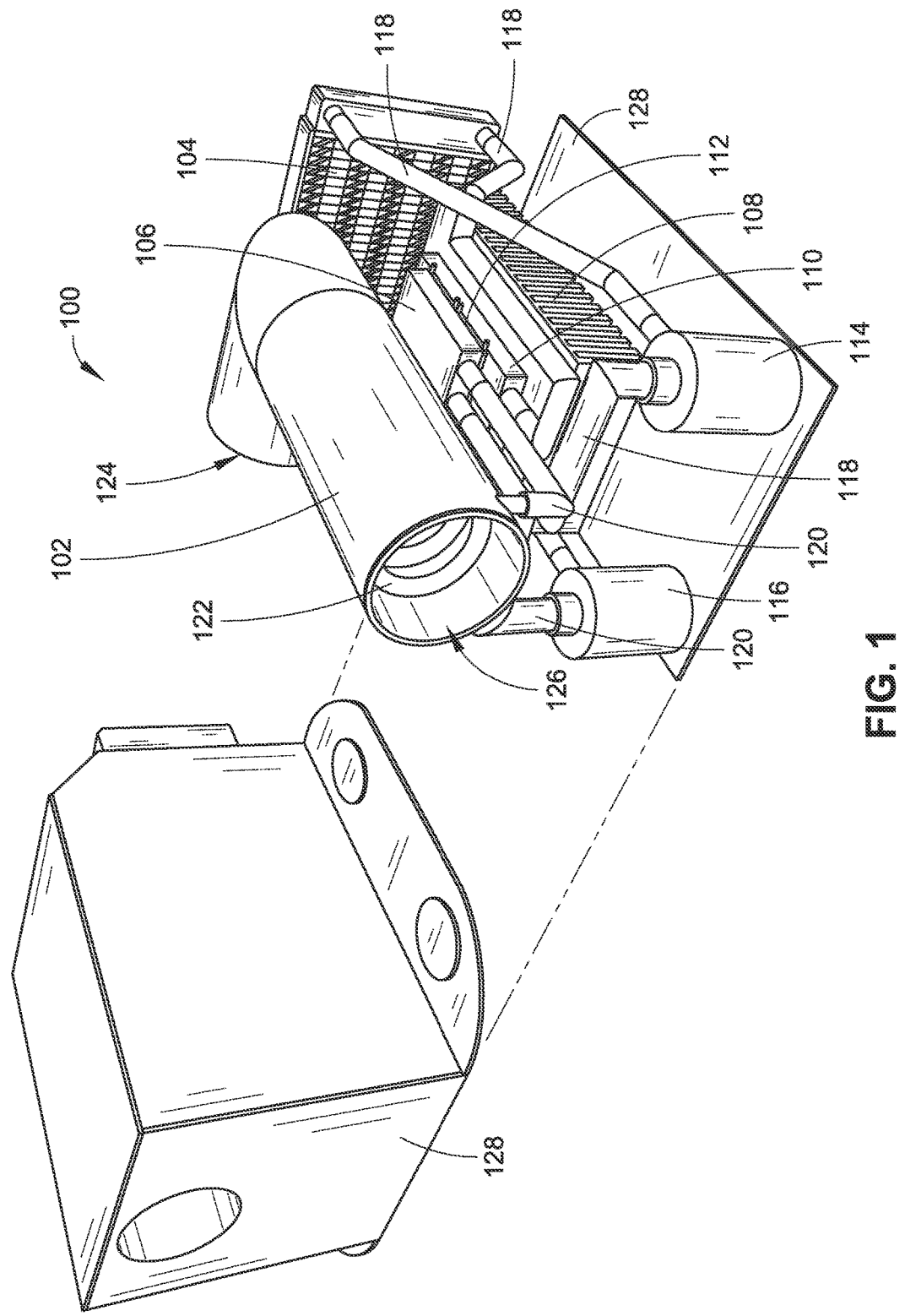
FIG. 1 is a partially exploded isometric view illustrating a motorcycle cooling device utilizing a peltier device in accordance with an exemplary implementation of the present disclosure.

Air conditioning units are commonly used in homes and vehicles to provide a more comfortable environment for an inhabitant or traveler. Many air conditioning systems use a refrigeration cycle where heat is transported from a cooler location to a hotter location. Work or energy is required to achieve the heat transfer because heat naturally flows in the opposite direction (e.g., from a hot location to a cooler location). A refrigerator often uses a refrigerant, such as a liquid coolant, as a medium that absorbs and removes heat from the space to be cooled and subsequently transfers that heat to another location. However, using an air conditioning system that uses a traditional refrigerant can take up significant space and require a significant amount of energy to operate. This space and energy requirement can present a difficulty in vehicles that have limited space and energy requirements, such as a motorcycle or all terrain vehicle.

Accordingly, a motorcycle air conditioning device, a motorcycle rider cooling device, and an air conditioning cooling system are described that include using a thermoelectric device and/or a turbo fan mountable on a motorcycle, an all-terrain vehicle, a utility task vehicle, or other vehicle where space and energy is limited. The motorcycle air conditioning device, the motorcycle rider cooling device, and the air conditioning cooling system may thus provide directed cooled air for a rider. In implementations, the motorcycle air conditioning device that employs example techniques in accordance with the present disclosure includes a heat dissipation assembly further including a hot water pump, a hot water piping coupled to the hot water pump, a hot water block coupled to the hot water piping, and a radiator coupled to the hot water piping; a cooling assembly further including a turbo fan assembly, a water coil disposed in housing for the turbo fan, cool water piping coupled with the water coil, a cool water pump coupled to the cool water piping, a cool water block coupled to the cool water piping, and a thermoelectric device coupled to the cool water block, where the thermoelectric device is configured to transfer heat from the cool water block to the hot water block; and a housing assembly configured to provide an enclosure to the heat dissipation assembly and the cooling assembly, where the housing is configured to be coupled to a motorcycle and provide cooled air to a rider. In implementations, a motorcycle rider cooling device includes a cooling assembly including a turbo fan assembly, where the turbo fan assembly is configured to be electrically coupled to a motorcycle; and a housing assembly configured to provide an enclosure to the cooling assembly, where the housing is configured to be coupled to a motorcycle and provide cooled air to a rider, where the cooling assembly is configured to be disposed on a motorcycle such that the turbo fan directs air onto a rider. In implementations, an air conditioning cooling system that employs example techniques in accordance with the present disclosure includes a heat dissipation assembly further including a hot water pump, hot water piping coupled to the hot water pump, a hot water block coupled to the hot water piping, a radiator coupled to the hot water piping, and a fan disposed adjacent to the radiator, where the fan is configured to blow air through the radiator; a cooling assembly including a turbo fan assembly, a water coil disposed in housing for the turbo fan, cool water piping coupled with the water coil, a cool water pump coupled to the cool water piping, a cool water block coupled to the cool water piping, and a thermoelectric device coupled to the cool water block, where the thermoelectric device is configured to transfer heat from the cool water block to the hot water block; a housing assembly configured to provide an enclosure to the heat dissipation assembly and the cooling assembly, where the housing is configured to be coupled to a motorcycle and provide cooled air to a rider; and a controller coupled to at least one of the turbo fan, the thermoelectric device, the hot water pump, or the cool water pump.

Example Implementations

FIGS. 1 through 7 illustrate a motorcycle air conditioning device 100, a motorcycle rider cooling device 100, and an air conditioning cooling system 100 in accordance with example implementations of the present disclosure. The motorcycle air conditioning device 100 as well as the motorcycle rider cooling device 100 and an air conditioning cooling system 100 can be used to direct cooled and/or cooling air onto a motorcycle rider, all-terrain vehicle rider, and/or utility task-type vehicle rider. This is advantageous, especially in warm weather, because it is difficult to contain cooling systems in these types of vehicles where a rider or user is exposed to the outside environment. Additionally, the small form-factor and reduced energy requirement of the motorcycle air conditioning device 100, the motorcycle rider cooling device 100, and/or the air conditioning cooling system 100 can be optimized and/or configured for a smaller vehicle (e.g., a motorcycle, etc.).

Figure 2:
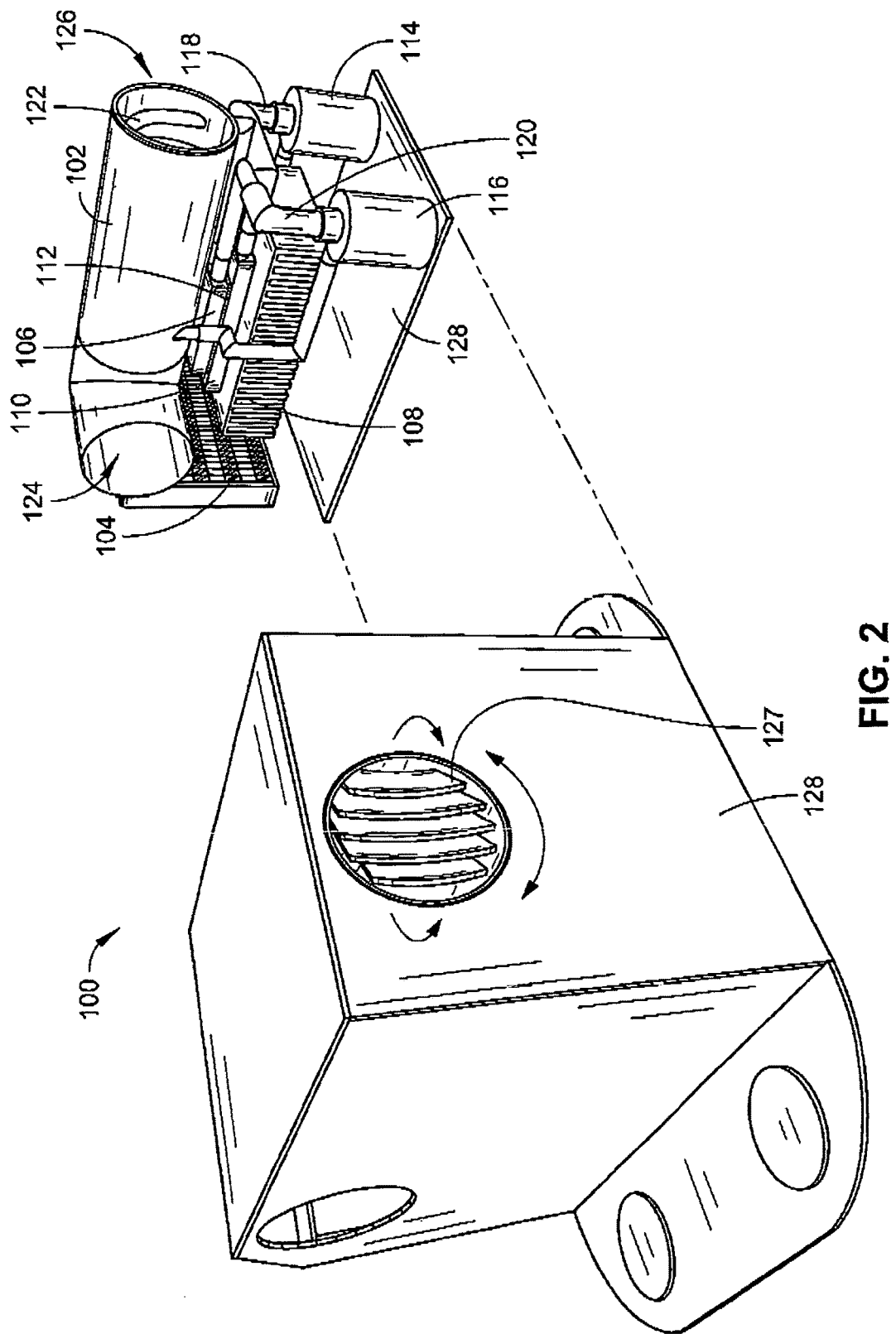
FIG. 2 is an isometric view illustrating a motorcycle cooling device utilizing a peltier device in accordance with an exemplary implementation of the present disclosure.

As shown in FIGS. 1 and 2, a motorcycle air conditioning device 100 includes a cooling assembly 300, a heat dissipation assembly 400, and a housing assembly 128. FIG. 1 illustrates the motorcycle air conditioning device 100 with the housing assembly 128 removed to show the interior components of the motorcycle air conditioning device 100. FIG. 2 illustrates another perspective of the motorcycle air conditioning device 100.

Figure 3:
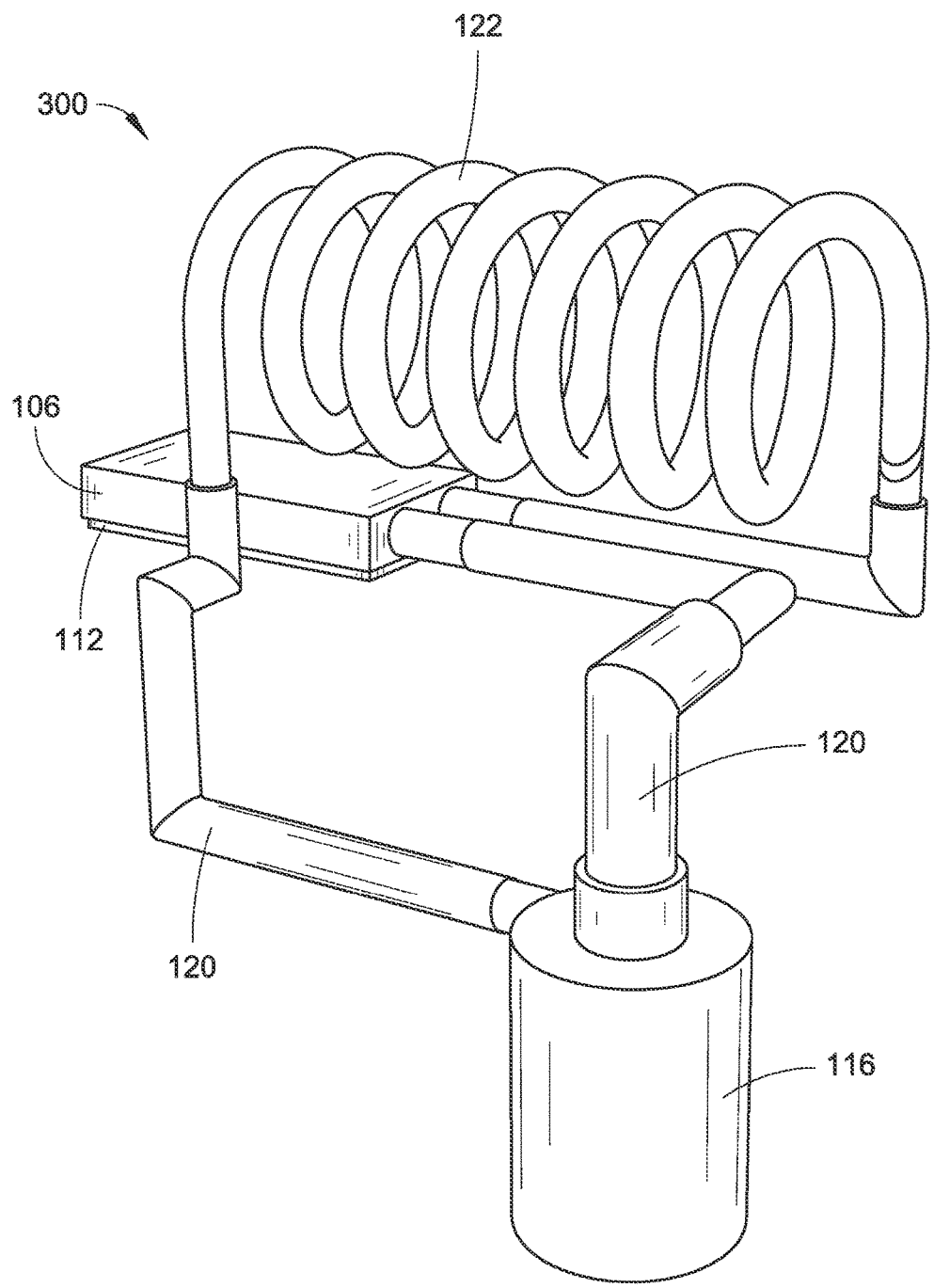
FIG. 3 is an isometric view of a cooling device utilized in the motorcycle cooling device shown in FIGS. 1 and 2 in accordance with an exemplary implementation of the present disclosure.

FIG. 3 illustrates an embodiment of the cooling assembly 300. In implementations, the cooling assembly 300 includes a turbo fan assembly 102. The turbo fan assembly 102 can include an electric-type turbo fan and/or a turbo bilge fan configured to function as an in-line blower. In an embodiment, an electric turbo bilge fan utilized in the turbo fan assembly 102 can include an electric fan with a diameter between approximately 2 inches to approximately 6 inches, where the fan is configured to require approximately 12 volts. The turbo fan can be housed within the turbofan assembly 102, which can additionally include turbo fan housing configured to cover, house, and protect the turbo fan and provide a pathway where air can enter an air intake 124 of the turbo fan assembly 102, be cooled by contacting a water coil 122, and be moved out a cooled air exhaust 126 and directed to a rider or user. The water coil 122 can include a material configured to contain a cooling fluid or liquid (e.g., water, coolant, etc.) and transfer heat from the air moving through the housing to the cooling fluid and/or liquid. In one specific implementation, the water coil 122 can include copper tubing that is wrapped in a helix configuration throughout the length of the turbo fan housing. The water coil 122 may also include other configurations, such as at least one linear length of tubing disposed in the turbo fan housing.

The turbo fan assembly includes turbo fan housing, which can be constructed from materials such as metal and/or a polymer or plastic. In one embodiment, the turbo fan assembly 102 housing is constructed from polyvinyl chloride-based material that is chosen for its strength and light weight characteristics. In another specific embodiment, the turbo fan housing can include a lightweight metal material, such as sheet metal formed in the desired form (e.g., a tube or cylinder) to house the turbo fan and water coil 122. Further, the turbo fan housing can include a thermal insulation material for preventing heat transfer to the cooled air before the cooled air exits the motorcycle air conditioning device 100. Some examples of thermal insulation material can include insulative paint, flexible elastomeric foam, polyethylene, extruded polystyrene foam, and/or a silica-Aerogel insulation. Additionally, the turbo fan housing may include directional blades 127 (FIG. 2) and/or turning-vanes disposed on the end of the turbo fan housing proximate to the cooled air exhaust 126, where the directional blades 127 and/or turning-vanes can be adjusted to alter and/or adjust the air flow direction. Further, the turbo fan housing can include a filter that can function to filter particulates and/or other material from the air flow through the turbo fan assembly 102. Some examples of filters can include a particulate air filter and/or an allergen air filter. The filter may be disposed anywhere in the turbo fan housing (e.g., proximate to the air intake 124, proximate to the cooled air exhaust 126, proximate to the turbo fan, etc.).

As shown in FIG. 3, the cooling assembly 300 includes a cool water block 106 coupled to the water coil 122. In implementations, the cool water block 106 can include a base, which is a section of the cool water block 106 configured to provide direct contact with a thermocooling device 112 (e.g., a Peltier unit). The cool water block 106 can also include at least one connection to cool water piping 120, which can be further connected to the water coil 122. In one embodiment, the cool water block 106 can be manufactured from at least one metal with high thermal conductivity (e.g., copper, aluminum, and/or silver). In some implementations, the cool water block 106 can be in the form of a rectangle or square, although other shapes and/or designs may be utilized.

Additionally, the cooling assembly 300 can include a cool water pump 116. In implementations, the cool water pump 116 can include an electrical water pump configured to pump cooling water through the cooling assembly 300 (e.g., through the cool water block 106, the cool water piping 120, and the water coil 122). In one specific embodiment, the cool water pump 116 includes an electrical impeller-type water pump. In other embodiments, other types of pumps may be used, such as a peristaltic and/or piston pump.

As shown in FIG. 3, the cooling assembly 300 includes a thermoelectric device 112 that is in direct proximity to and/or in direct contact with the cool water block 106. In some embodiments, a thermal pad and/or thermal grease can be placed between the thermoelectric device 112 and the cool water block 106. In other embodiments, the thermoelectric device 112 can be in direct contact with the cool water block 106. In one implementation, the thermoelectric device 112 can include at least one Peltier device. The Peltier device can include a solid-state active heat pump, which transfers heat from one side of the Peltier device to the other side of the Peltier device (e.g., from the cooling assembly 300 side to the heat dissipation assembly 400 side) using the Peltier effect, which is the presence of heating or cooling at an electrified junction of two different conductors. In a specific example, two or more thermoelectric devices 112 can be placed in series to increase the heat transfer effect of each thermoelectric device 112, such as two Peltier devices in series.

In one specific implementation, the cooling assembly 300 can include a copper-based water block 106, a Peltier-type thermoelectric device 112 in direct contact with the copper-based water block 106, a cool water pump 116, a water coil 122, and copper cool water piping 120 (in a helix design configured to be housed by turbo fan housing) that connects the copper-based water block 106, the cool water pump 116, and the water coil 122.

Figure 4:
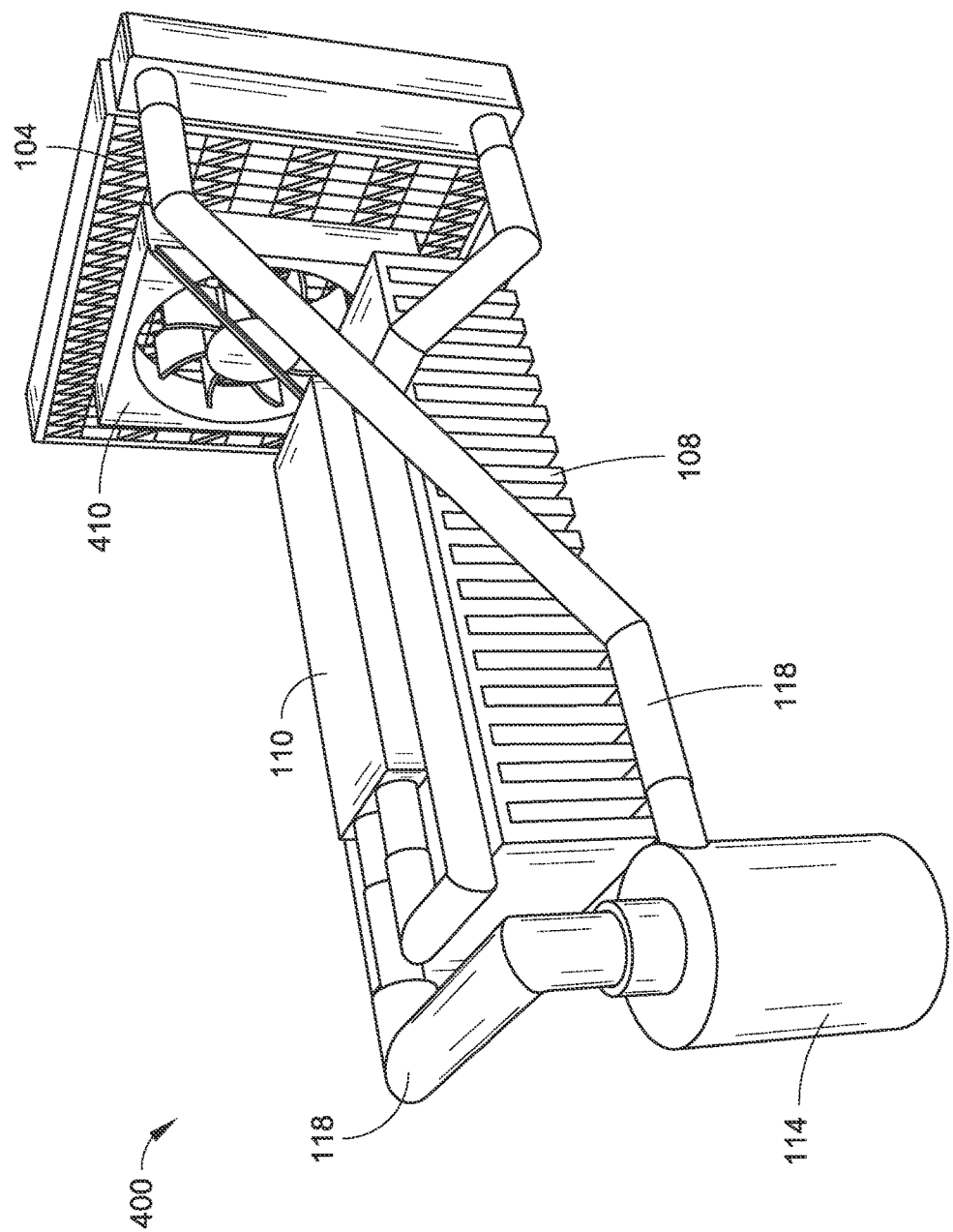
FIG. 4 is an isometric view of a heat dissipation assembly utilized in the motorcycle cooling device shown in FIGS. 1 and 2 in accordance with an exemplary implementation of the present disclosure.
Figure 5:
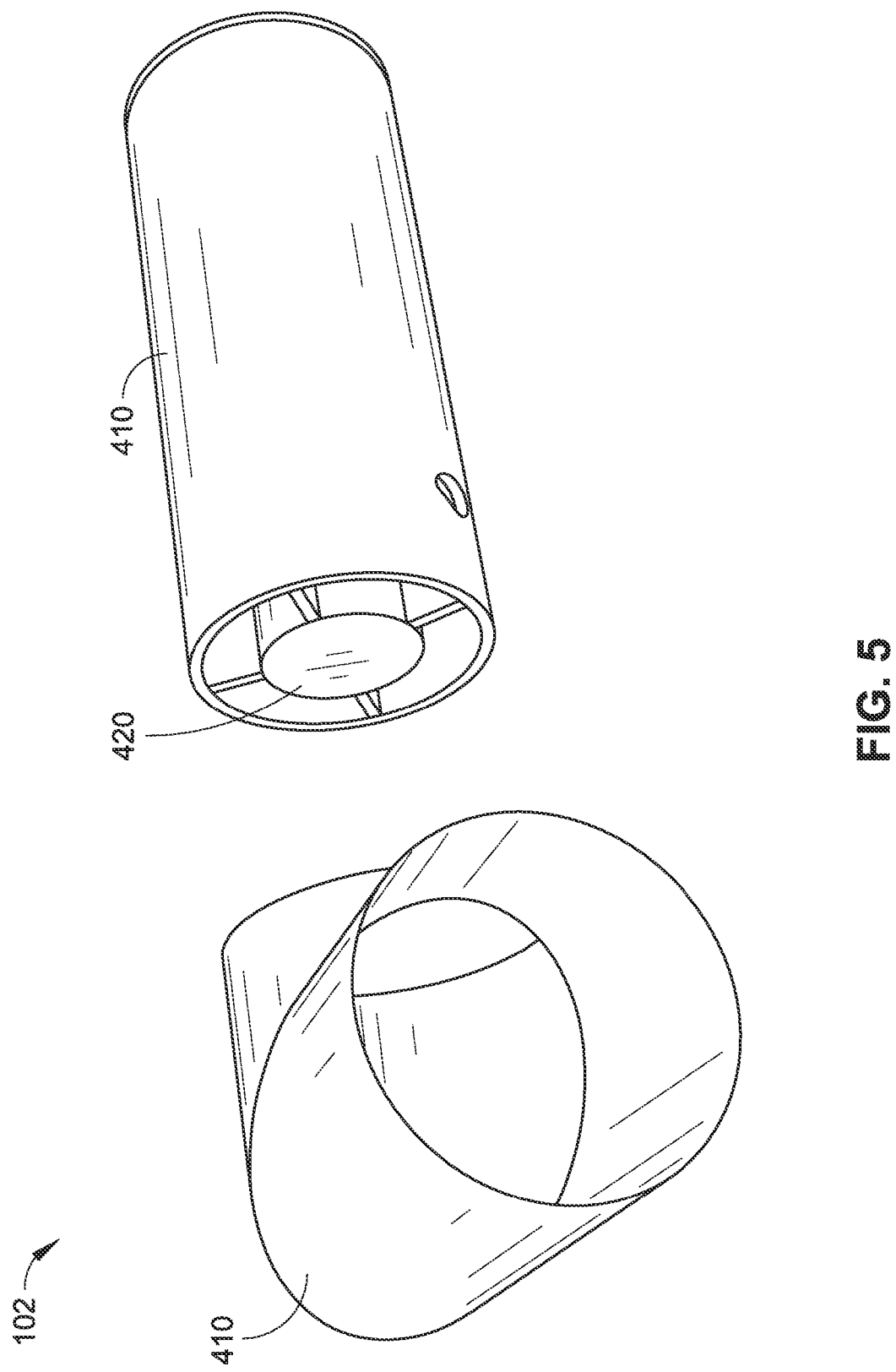
FIG. 5 is a partially exploded isometric view of a turbo fan housing utilized in the motorcycle cooling device shown in FIGS. 1 and 2 in accordance with an exemplary implementation of the present disclosure.

As shown in FIGS. 1 and 4, the motorcycle air conditioning device 100 includes a heat dissipation assembly 400. Further illustrated in FIG. 4, the heat dissipation assembly 400 includes a hot water pump 114, a hot water block 110 coupled to the hot water pump 114 with hot water piping 118, and a radiator 104 coupled to the hot water block 110 and the hot water pump 114 with the hot water piping 118. In implementations, a hot water pump 114 can include an electric-powered water pump configured to pump water through the heat dissipation assembly 400. In one specific implementation, the hot water pump 114 includes an impeller-type pump similar to the cool water pump 116 discussed above. The hot water pump 114 may be connected to the hot water block 110 and the radiator 104 with the hot water piping 118, which may include copper-based piping.

Additionally, the heat dissipation assembly 400 includes a hot water block 110 configured to directly contact the thermoelectric device 112. The hot water block 110 can function similarly to the cool water block 106, which can include a base having a contact area and configured for providing an area of heat transfer from the thermoelectric device 112 to liquid (e.g., water, coolant, etc.) within the hot water block 110. Additionally, the hot water block 110 can include connections configured to connect to the hot water piping 118.

As illustrated in FIG. 4, the hot water block 110 can be connected to the hot water pump 114 and radiator 104 with hot water piping 118. The radiator 104 can include a heat exchanger used to transfer heat from the liquid and/or water in the heat dissipation assembly 400 to the outside environment. One example of a radiator 104 can include a convection-type radiator, which includes a core in which hot liquid/water passes through. The heat in the hot liquid is transferred from the core to the outside surface area (e.g., metal fins) of the radiator. The heat is then further transferred from the outside surface of the radiator 104 to the outside environment (e.g., by way of air convection). In some embodiments, a fan 410 (e.g., an electric fan) can be disposed proximate to the radiator 104 to assist with air convection and moving air past the outside surface of the radiator 104. In other embodiments, air convection proximate to the radiator 104 may be facilitated by natural movement of ambient air and without an additional fan or air movement device.

A heat sink 108 may be disposed adjacent to and/or in contact with the hot water block 110 for additional cooling capability. In implementations, the heat sink 108 can include a passive heat exchanger that cools the hot water block 110. A heat sink 108 is designed to maximize its surface area in contact with the ambient air surrounding the heat sink 108. For example, the heat sink 108 can include an array of fins, which increase the surface area available for heat transfer. In an embodiment, the fins of the heat sink 108 extend away from the side of the heat sink 108 in direct contact with the hot water block 110. In some implementations, a thermal pad, a thermal adhesive, and/or thermal grease can be placed between the hot water block 110 and the heat sink 108 for facilitating greater cooling capability and heat transfer. The heat sink 108 can be fabricated using materials with high thermal conductivity, such as aluminum, aluminum alloys, copper, copper alloys, and/or composite materials, such as copper-tungsten pseudoalloy, and/or silicon carbide in an aluminum matrix.

As shown in FIGS. 1 and 2, the motorcycle air conditioning device can include a housing assembly 128. The housing assembly 128 can function to contain and/or provide protection for the cooling assembly 300 and/or heat dissipation assembly 400. Additionally, the housing assembly 128 may serve to provide protection to the vehicle (e.g., motorcycle, all-terrain vehicle, utility task vehicle, etc.) and/or the user/rider from the motorcycle air conditioning device 100. In some implementations, the housing assembly 128 can be constructed from a textile-based housing. In one example utilizing a textile-based material, the housing assembly 128 can include a canvas material. In other implementations, the housing assembly 128 can include a metal-based housing, such as a sheet metal housing. In yet other implementations, the housing assembly 128 can include a semi-flexible material that is configured to provide structure and support as a housing, yet still be flexible when placing the motorcycle air conditioning device 100 on a motorcycle and/or other vehicle. In one example utilizing a semi-flexible material, the housing assembly 128 includes a rubber-based housing. In yet another example, the housing assembly 128 includes a polymer-based housing, such as nylon and/or epoxy-based resin.

Additionally, the housing assembly 128 can include means for coupling the motorcycle air conditioning device 100 to a motorcycle or other vehicle. In one implementation, means for coupling the motorcycle air conditioning device 100 to a motorcycle can include a magnetic assembly, for example at least one magnet built into and/or as a part of the housing. For example, the magnetic assembly can include a set of four magnets disposed in a bottom portion (e.g., the side of the housing assembly 128 that contacts the vehicle) of the housing assembly 128 such that when the motorcycle air conditioning device 100 is placed on a motorcycle 700 (or other all-terrain vehicle, utility task vehicle, etc.), the magnets couple the motorcycle air conditioning device 100 to the gas tank or other metal component of the motorcycle 700. Other examples of means for coupling the motorcycle air conditioning device 100 to a vehicle can include at least one strap, clamps, bolts, screws, etc. In these implementations and examples, the means for coupling can be configured to safely and securely couple the motorcycle air conditioning device 100 to the motorcycle 700 or other vehicle.

In one embodiment, a motorcycle rider cooling device 100 can include a cooling assembly 300 and a housing assembly 128. In this specific embodiment, the motorcycle rider cooling device 100 functions to direct an ambient air flow to the rider of a motorcycle, all-terrain vehicle, and/or utility task vehicle in order to provide air convection for a cooling effect. In this embodiment, the cooling assembly 300 includes a turbo fan assembly 102. The turbo fan assembly 102 can include a turbo fan 420 housed within a turbo fan housing 410. In one embodiment, the turbo fan 420 can include a turbo bilge fan (e.g., having a diameter from about two inches to about six inches). It is contemplated that the turbo fan 420 can include other types of fans for providing airflow through the turbo fan housing 410. In some implementations, the turbo fan housing 410 can include a polymer-based material, such as polyvinyl chloride, rubber, epoxy, and/or nylon. In some other implementations, the turbo fan housing 410 can include a metal-based material, such as sheet metal. Further, the turbo fan assembly 102 can include a filter and/or directional blades and/or turning vanes as previously described. In some implementations, the turbo fan housing can include angled sections, such as the 90° elbow illustrated in FIG. 5. Other angled sections may also be utilized in the turbo fan housing 410, such as a 45° section, a 20° section, and/or a 10° section.

In one specific embodiment, the motorcycle air conditioning device 100, a motorcycle rider cooling device 100, and/or an air conditioning cooling system 100 can include at least one sensor 610. Some examples of a sensor 610 that may be used can include a temperature sensor (e.g., thermometer, thermocouple, infrared thermometer, etc.) and/or an airflow sensor. For example, the turbo fan assembly 102 can include at least one thermocouple for measuring the temperature of the cooled air and an airflow sensor for measuring the air flow rate through the turbo fan assembly 102. In this example, the speed of the turbo fan and the cooling capacity of the cooling assembly 300 (e.g., water flow rate through the cooling assembly 300 and/or the heat dissipation assembly 400) can be adjusted by controller 602 depending on the desired cooling temperature setting(s). In implementations, sensor 610 can be communicatively coupled to the controller 602 and/or a user interface.

In one specific embodiment, a motorcycle air conditioning device 100 includes a cooling assembly 300, a heat dissipation assembly 400, and a housing assembly 128. In this specific embodiment, the motorcycle air conditioning device 100 measures approximately 330 mm×350.5 mm×204 mm. In this specific embodiment, the turbo fan measures approximately 176 mm with a diameter of approximately 74 mm, the cool water block measures approximately 81 mm×41 mm×12 mm, the hot water block measures approximately 121 mm×41 mm×12 mm, the radiator measures approximately 158 mm×20 mm×115 mm, the radiator turbo fan measures approximately 80 mm×15 mm×80 mm, the heat sink measures approximately 175 mm×100 mm×40 mm, the thermoelectric device measures approximately 40 mm×2 mm×40 mm, and the impeller-type water pump measures approximately 75 mm with a diameter of about 43 mm. In this specific embodiment, the motorcycle air conditioning device 100 can require between about 8 amps and 13.3 amps. In some implementations, the motorcycle air conditioning device 100 can require less than 14 amps. In other implementations, the motorcycle air conditioning device 100 can require less than 10 amps.

Figure 6:
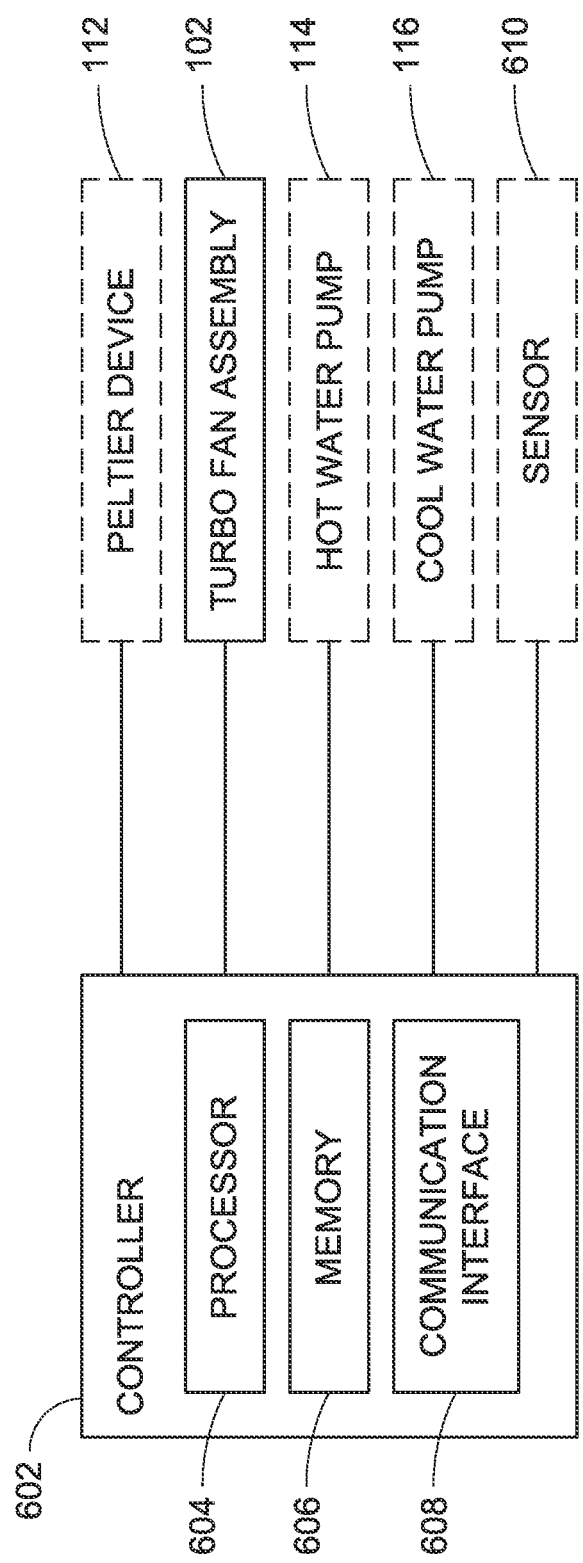
FIG. 6 is a block diagram illustrating a controller utilized in the motorcycle air conditioning device shown in FIGS. 1 and 2 in accordance with an exemplary implementation of the present disclosure.
Figure 7:
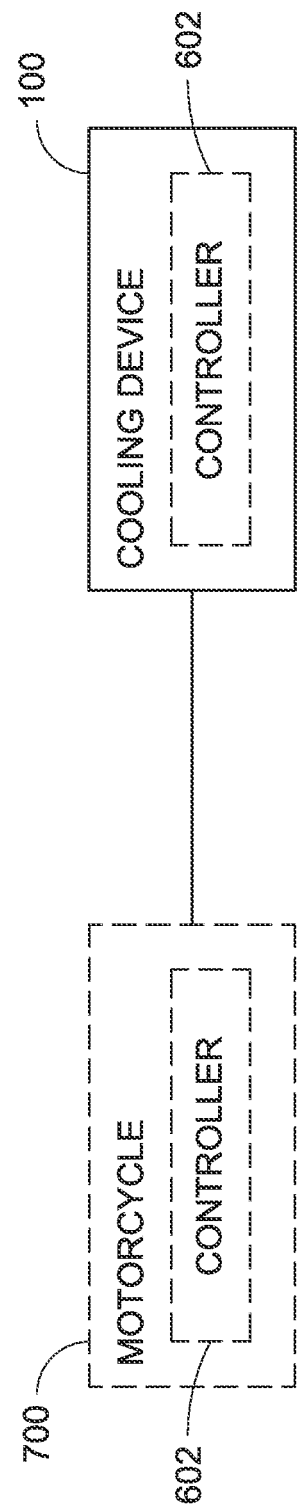
FIG. 7 is a block diagram illustrating a motorcycle cooling device and motorcycle in accordance with an exemplary implementation of the present disclosure.

In a specific embodiment, an air conditioning cooling system 100 includes a heat dissipation assembly 400, a cooling assembly 300, a housing assembly 128, and a controller 602. As illustrated in FIGS. 6 and 7, a controller 602 can be included in and/or coupled to the motorcycle air conditioning device 100, a motorcycle rider cooling device 100, and/or an air conditioning cooling system 100. In some implementations and as shown in FIG. 7, the controller 602 can be included in a motorcycle 700 (e.g., a motorcycle, an all-terrain vehicle, a utility task vehicle, a vehicle where the operator is exposed to outside air, etc.). In other implementations, also shown in FIG. 7, the controller can be included as a component of the motorcycle air conditioning device 100, a motorcycle rider cooling device 100, and/or an air conditioning cooling system 100. The controller 602 may provide a user interface (e.g., a touch interface or other control interface including switches, dials, inputs, an LED display, gauges, etc.) for a rider to control the functions and/or operation of the motorcycle air conditioning device 100, a motorcycle rider cooling device 100, and or an air conditioning cooling system 100, such as inputting a desired temperature setting and/or turning the motorcycle air conditioning device 100, a motorcycle rider cooling device 100, and or an air conditioning cooling system 100 on or off. In some implementations, the controller 602 may include a touch interface configured as a touch screen (e.g., a touch panel overlaying a display) that can detect a touch input within the area of the display for entry of information and commands. In implementations, the touch screen may employ a variety of technologies for detecting touch inputs. For example, the touch screen may employ infrared optical imaging technologies, resistive technologies, capacitive technologies, surface acoustic wave technologies, and so forth. In some implementations, buttons, keypads, knobs, dials, and so forth, may be used for entry of data and commands instead of, or in addition to, a touch screen. The controller 602 can include a processor 604, memory 606, a communication interface 608, and/or a sensor 610.

As illustrated in FIG. 6, the controller 602 can include a processor 604. The processor 604 provides processing functionality for the motorcycle air conditioning device 100, a motorcycle rider cooling device 100, and/or an air conditioning cooling system 100 and may include any number of processors, micro-controllers, or other processing systems and resident or external memory for storing data and other information accessed or generated by the motorcycle air conditioning device 100, a motorcycle rider cooling device 100, and/or an air conditioning cooling system 100. The processor 604 may execute one or more software programs which implement techniques described herein. The processor 604 is not limited by the materials from which it is formed or the processing mechanisms employed therein and, as such, may be implemented via semiconductor(s) and/or transistors (e.g., electronic integrated circuits (ICs)), and so forth.

As shown in FIG. 6, the memory 606 is an example of computer-readable media that provides storage functionality to store various data associated with the operation of the motorcycle air conditioning device 100, a motorcycle rider cooling device 100, and/or an air conditioning cooling system 100, such as software programs and code segments for controlling and/or operating the thermoelectric device 112, the turbo fan assembly 102, the hot water pump 114, the cool water pump 116, the sensor 610, and/or other electronic components, or other data to instruct the processor 604 and other elements of the motorcycle air conditioning device 100, a motorcycle rider cooling device 100, and/or an air conditioning cooling system 100 to perform the functionality described herein. Although a single memory 606 is shown, a wide variety of types and combinations of memory may be employed. The memory 606 may be integral with the processor 604, stand-alone memory, or a combination of both. The memory 606 may include, for example, removable and non-removable memory elements, such as random-access memory (RAM), read-only memory (ROM), flash memory (e.g., a secure digital (SD) card, a mini-SD card, and/or a micro-SD card), magnetic memory, optical memory, universal serial bus (USB) memory, and so forth The controller 602 includes a communication interface 608. The communication interface 608 is operatively configured to communicate with components of the motorcycle air conditioning device 100, a motorcycle rider cooling device 100, and/or an air conditioning cooling system 100. For example, the communication interface 608 can be configured to transmit data for storage in the motorcycle air conditioning device 100, a motorcycle rider cooling device 100, and/or an air conditioning cooling system 100, retrieve data from storage in the motorcycle air conditioning device 100, a motorcycle rider cooling device 100, and/or an air conditioning cooling system 100, and so forth. The communication interface 608 is also communicatively coupled with the processor 604 to facilitate data transfer between components of the motorcycle air conditioning device 100, a motorcycle rider cooling device 100, and/or an air conditioning cooling system 100 and the processor 604 (e.g., for communicating inputs to the processor 604 received from a device communicatively coupled with the motorcycle air conditioning device 100, a motorcycle rider cooling device 100, and/or an air conditioning cooling system 100 and/or controller 602). It should be noted that while the communication interface 608 is described as a component of controller 602, one or more components of the communication interface 608 can be implemented as external components communicatively coupled to the motorcycle air conditioning device 100, a motorcycle rider cooling device 100, and/or an air conditioning cooling system 100 via a wired and/or wireless connection. The motorcycle air conditioning device 100, a motorcycle rider cooling device 100, and/or an air conditioning cooling system 100 can also comprise and/or connect to one or more input/output (I/O) devices (e.g., via the communication interface 608), including, but not necessarily limited to: a display, a touchpad, a keypad, and so on.

The communication interface 608 and/or the processor 604 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communication interface 608 can be configured to communicate with a single network or multiple networks across different access points.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A motorcycle air conditioning device configured to provide cooled air to a rider, comprising:
the motorcycle air conditioning device configured to couple to a motorcycle, the motorcycle air conditioning device including
a heat dissipation assembly including
a hot water pump,
hot water piping coupled to the hot water pump,
a hot water block coupled to the hot water piping,
a heat sink disposed adjacent to the hot water block, and
a radiator coupled to the hot water piping;
a cooling assembly including
a turbo fan assembly, a water coil disposed in a turbo fan housing for a turbo fan in the turbo fan assembly, wherein the water coil comprises copper tubing wrapped in a helix configuration throughout a length of a turbo fan housing, cool water piping coupled with the water coil, a cool water pump coupled to the cool water piping, a cool water block coupled to the cool water piping, wherein the cool water block is a copper-based cool water block, and a thermoelectric device coupled to the cool water block, where the thermoelectric device is configured to transfer heat from the cool water block to the hot water block;

a housing assembly comprising the turbo fan housing and configured to provide an enclosure to the heat dissipation assembly and the cooling assembly, where the housing assembly is configured to be coupled to a motorcycle and provide cooled air to a rider, wherein the turbo fan housing comprises directional blades disposed on the end of the turbo fan housing proximate to a cooled air exhaust, wherein the directional blades are configured to be adjusted to alter an air flow direction; and a controller configured to adjust a temperature of the cooled air and an airflow through the turbo fan assembly, based at least in part on a desired cooling temperature setting.

2. The motorcycle air conditioning device in claim 1, further comprising:

a heat sink coupled to the hot water block.

3. The motorcycle air conditioning device in claim 1, farther comprising:

a fan coupled to the radiator.

4. The motorcycle air conditioning device in claim 1, wherein the turbo fan assembly includes a turbo bilge fan.

5. The motorcycle air conditioning device in claim 4, wherein the turbo fan bilge fan has a diameter between two inches and six inches.

6. The motorcycle air conditioning device in claim 1, wherein the turbo fan assembly is capable of altering exhaust air direction.

7. The motorcycle air conditioning device in claim 1, wherein the thermoelectric device includes a Peltier device.

8. The motorcycle air conditioning device in claim 1, wherein the housing assembly comprises a textile-based housing.

9. The motorcycle air conditioning device in claim 1, wherein the housing assembly comprises a metal-based housing.

10. The motorcycle air conditioning device in claim 1, wherein the motorcycle air conditioning device requires between 8.08 total amps and 13.28 total amps.

11. The motorcycle air conditioning device in claim 1, wherein the motorcycle air conditioning device measures 13 inches length by 13.8 inches width by 8 inches height.

12. A motorcycle rider cooling device, comprising:

a cooling assembly comprising a turbo fan assembly, wherein the turbo fan assembly is configured to be electrically coupled to a motorcycle;

a heat dissipation assembly comprising a hot water pump, hot water piping coupled to the hot water pump, a hot water block coupled to the hot water piping, a heat sink disposed adjacent to the hot water block, a radiator coupled to the hot water piping, and a fan disposed adjacent to the radiator, wherein the fan is configured to blow air through the radiator, a housing assembly comprising a turbo fan housing, and configured to provide an enclosure to the cooling assembly, where the housing is configured to be coupled to the motorcycle and provide cooled ambient air to a rider, wherein the cooling assembly is configured to be disposed on the motorcycle such that the turbo fan directs cooled ambient air onto the rider, wherein the turbo fan housing comprises directional blades disposed on the end of the turbo fan housing proximate to a cooled air exhaust, wherein the directional blades are configured to be adjusted to alter an air flow direction; and a controller configured to adjust a temperature of the cooled ambient air and an airflow through the turbo fan assembly, based at least in part on a desired cooling temperature setting.

13. The motorcycle rider cooling device in claim 12; wherein the turbo fan assembly includes a turbo bilge fan.

14. The motorcycle rider cooling device in claim 13, wherein the turbo fan bilge fan has a diameter between two inches and six inches.

15. The motorcycle rider cooling device in claim 12, wherein the turbo fan assembly is capable of changing exhaust air direction.

16. The motorcycle rider cooling device in claim 12, wherein the housing assembly comprises a textile-based housing.

17. The motorcycle rider cooling device in claim 12, wherein the housing assembly comprises a metal-based housing.

18. An air conditioning cooling system, comprising:

a heat dissipation assembly including a hot water pump, hot water piping coupled to the hot water pump, a hot water block coupled to the hot water piping, a heat sink disposed adjacent to the hot water block, a radiator coupled to the hot water piping, and a fan disposed adjacent to the radiator, where the fan is configured to blow air through the radiator;

a cooling assembly including a turbo fan assembly, a water coil disposed in a turbo fan housing for a turbo fan in the turbo fan assembly, wherein the water coil comprises copper tubing wrapped in a helix configuration throughout a length of a turbo fan housing, cool water piping coupled with the water coil, a cool water pump coupled to the cool water piping, a cool water block coupled to the cool water piping, and a thermoelectric device coupled to the cool water block, where the thermoelectric device is configured to transfer heat from the cool water block to the hot water block;

a housing assembly comprising the turbo fan housing and configured to provide an enclosure to the heat dissipation assembly and the cooling assembly, where the housing is configured to be coupled to a motorcycle and provide cooled air to a rider, wherein the turbo fan housing comprises directional blades disposed on the end of the turbo fan housing proximate to a cooled air exhaust, wherein the directional blades are configured to be adjusted to alter an air flow direction; and a controller configured to adjust a temperature of the cooled air and an airflow through the turbo fan assembly, based at least in part on a desired cooling temperature setting.

* * * * *